United States Patent
Duchan et al.

(10) Patent No.: US 9,609,506 B2
(45) Date of Patent: Mar. 28, 2017

(54) IDENTITY SUSPENSION METHOD FOR A MOBILE DEVICE

(71) Applicant: Gimso Mobile Ltd., Raanana (IL)

(72) Inventors: Eran Duchan, Beit Itzhak (IL); Nir Berman, Tel Aviv-Yafo (IL)

(73) Assignee: Gimso Mobile Ltd., Raanana (IL)

( * ) Notice: Subject to any disclaimer, the term of this patent is extended or adjusted under 35 U.S.C. 154(b) by 0 days.

(21) Appl. No.: 15/109,766

(22) PCT Filed: Jan. 6, 2015

(86) PCT No.: PCT/IL2015/050023
§ 371 (c)(1),
(2) Date: Jul. 5, 2016

(87) PCT Pub. No.: WO2015/102007
PCT Pub. Date: Jul. 9, 2015

(65) Prior Publication Data
US 2016/0330607 A1  Nov. 10, 2016

(30) Foreign Application Priority Data

Jan. 6, 2014  (IL) .......................................... 230345

(51) Int. Cl.
*H04W 8/18* (2009.01)
*H04W 12/06* (2009.01)
*H04W 4/00* (2009.01)

(52) U.S. Cl.
CPC ........... *H04W 8/183* (2013.01); *H04W 4/003* (2013.01); *H04W 12/06* (2013.01)

(58) Field of Classification Search
CPC ..... H04W 8/183; H04W 4/003; H04W 12/06; H04L 63/0853
See application file for complete search history.

(56) References Cited

U.S. PATENT DOCUMENTS

| | | | |
|---|---|---|---|
| 6,957,060 B1 * | 10/2005 | Sharp .................... | H04M 15/39 455/410 |
| 2004/0192251 A1 | 9/2004 | Zhao et al. | |
| 2006/0205434 A1 * | 9/2006 | Tom ........................ | H04W 8/26 455/558 |

FOREIGN PATENT DOCUMENTS

WO   2012140654 A1   10/2012

* cited by examiner

*Primary Examiner* — Marcos Torres

(57) ABSTRACT

This inventions relates to an identity suspension method and system for a mobile device designed for operation with a subscriber identification module (SIM) card, wherein the mobile device further includes a virtual SIM device. The virtual SIM device acts as a bridge between a remotely located SIM card, and the mobile device. The virtual SIM device can detect when the mobile device requests an identity or when the cellular services provider is attempting to authenticate the identity associated with the mobile device. Should the virtual SIM device sense that the process may not be completed for any reason, the virtual SIM device returns a transient error to the mobile device and effectively present a new "parking" identity to the mobile device using procedures defined in SIM toolkit.

12 Claims, 5 Drawing Sheets

IDENTITY SUSPENSION METHOD FOR A MOBILE DEVICE

CROSS-REFERENCE TO RELATED APPLICATIONS

This application is the United States National Phase of Patent Application No. PCT/IL2015/050023 filed 6 Jan. 2015, which claims priority to Israeli Patent Application No. 230345 filed 6 Jan. 2014, each of which is incorporated herein by reference.

FIELD OF THE INVENTION

The present invention, in some embodiments thereof, relates to wireless communication and, more particularly, but not exclusively, to methods and devices for establishing and maintaining communication sessions with cellular network subscribers.

BACKGROUND OF THE INVENTION

The present invention, in some embodiments thereof, relates to wireless communication and, more particularly, but not exclusively, to methods and systems to establish and maintain communication sessions with cellular network subscribers.

As commonly known, there are many mobile or cellular services providers in the world, usually more than one in a single country. These cellular services providers include, but are not limited to, service providers who provide mobility services using global system for mobile communications (GSM), general packet radio service (GPRS), third generation (3G), code division multiple access (CDMA), time division multiple access (TDMA), personal handy phone system (PHS), wideband CDMA (WCDMA), integrated digital enhanced network (IDEN) and wireless local loop (WLL) technologies or their variants. These cellular services providers provide voice, cellular messaging and data services to their own subscribers and to subscribers from other networks.

As commonly known, wireless networks use numeric identifiers to communicate with Mobile Stations (MS) over an air interface. Messages or communications exchanged between the wireless network and MS contain remotely acquired identification data that permits the network to distinguish between different MS while performing operations related to calls and roaming. For example, GSM based wireless networks are specified to support an international mobile station identity (IMSI) as the identifier for MS so that billable services can be provided to international roamers. The IMSI is a unique identifier up to 15 digits in length allocated to each mobile subscriber. The IMSI is a unique identifier is stored, for example, in a subscriber identification module (SIM) card, along with other confidential information known only to the SIM and the cellular services provider to whom the SIM card belongs.

The term "identification data" as defined herein, refers to data that contains information regarding the identity of a mobile device such as a mobile phone, a mobile tablet, smart cameras and a portable computer, wherein the identity information is typically kept on a removable device such as SIM card (the removable device is referred to herein, with no limitations, as a "SIM card"). It should be noted that the mobile device may store identification data on the SIM card. Example SIM cards that are currently in use include SIM cards, USIM cards and UICC cards. They may be marked as such or a combination thereof.

When a mobile device in a GSM network attempts registration to a particular cellular services provider, the most basic mandatory element the mobile device is required to provide is a global unique identity, i.e. the IMSI, so that the cellular services provider may be able to provision billable services for that mobile device. This unique identity is typically stored in a particular SIM card, along with other confidential information known only to that particular SIM and to the cellular services provider that owns that particular SIM.

Upon presentation of the unique identity, and optionally periodically, the cellular services provider attempts to authenticate the received unique identity through procedures described in 3GPP 33.102, which is incorporated herein by reference, by sending an authentication message to the SIM card via the mobile device. Using confidential data known only to the SIM and the cellular services provider, the SIM generates a response message and the mobile device sends that response message to the cellular services provider.

In embodiments where no SIM card is presented and the identity of the mobile device is effectively stored remotely, as described in WO/2012/140654, which is incorporated herein by reference as if fully set forth herein, there may be situations in which time no valid identity can be presented or the previously presented identity cannot complete the initial authentication process or a periodic authentication process. This may be due to the fact that a connection to the remote identity has yet to be established, configuration issues, connectivity issues between the mobile device and the remotely stored identity, or other transient ailments.

Under normal conditions this would typically result in the mobile device prompting the user that no SIM card exists and that he/she must reboot his/her mobile device. The mobile device may also prompt the user with a message to replace the SIM card or remove the SIM card.

There is therefore a need, when the identity of the mobile device is effectively stored remotely, and no valid identity can be presented or be authenticated, to prevent the mobile device from prompting the user with a notification that no SIM card exists and that he/she must reboot his/her mobile device.

SUMMARY OF THE INVENTION

The principal intentions of the present invention include providing an identity suspension method for a mobile device designed for operation with a SIM card, wherein the mobile device further includes a virtual SIM device. The virtual SIM device is operatively disposed in the mobile device instead of a conventional SIM card, and acts as a bridge between a remotely located SIM card, and the mobile device. The virtual SIM device can detect when the mobile device requests an identity (typically during power up) or when the cellular services provider is attempting to authenticate the identity associated with the mobile device (typically during power up and periodically according to a myriad of factors).

Should the virtual SIM device sense that the process may not be completed for any reason, the virtual SIM device returns a transient error to the mobile device (e.g. when the cellular services provider is requesting authentication and the communication flow between the virtual SIM device and the remotely located SIM card is lost, the virtual SIM device may respond with 0x9862—"Authentication error, application specific" according to TS 102.221) and effectively present a new "parking" identity to the mobile device using procedures defined in SIM toolkit (including, but not limited to, a UICC reset request).

The "parking" identity is a specially tailored identity that satisfies the requirement of the mobile device for a valid identity, but does not trigger an authentication process, since that valid identity does not belong to any cellular services provider. For example, the identity may be an identity of MCC/MNC 00101 that is assigned to "GSM Test Network" cellular services provider.

Once the virtual SIM device regains the ability to retrieve and authenticate a cellular services provider owned identity, the virtual SIM presents the retrieved identity to the mobile device using the same methods used to present the "parking" identity.

According to the teachings of the present invention there is provided an identity suspension method of remotely updating a portable-storage-device, the portable-storage-device uses an updating unit, operatively connected to a remote unit, for receiving identification data, the method including the step of monitoring the operational connectivity between the portable-storage-device and the remote unit, wherein upon detecting no operational connectivity between the updating unit and the remote unit, setting a remote-connectivity-status to a no-connectivity state, and wherein upon detecting operational connectivity between the updating unit and the remote unit, setting the remote-connectivity-status to an operational state.

Upon the portable-storage-device receiving an authentication request form a hosting-mobile-device, during the operational state, the method proceeds with obtaining new identification data by the portable-storage-device from the remote unit, over a network, typically a wireless network; updating the portable-storage-device with the new identification data received from the remote unit the through the updating unit; and providing the new identification data to the hosting-mobile-device, after the new identification data is updated in the portable-storage-device.

Upon the portable-storage-device receiving an authentication request form the hosting-mobile-device, during the no-connectivity state, the method proceeds as follows:

When detecting loss of connectivity between the updating unit and the remote unit, changing the identity stored in the portable storage device to a temporary identity and instructing the hosting-mobile-device to use the temporary identification.

When detecting reestablishment of operational connectivity between the updating unit and the remote unit, changing the temporary identity stored in the portable storage device to an identity provided by the remote unit and instructing the hosting-mobile-device to use the newly provided identity.

Preferably, the temporary identification includes instructions to the hosting-mobile-device not to search for a cellular communication network except for mandatory emergency call services.

Typically, the wireless network is selected from the group including an internet communication network and a cellular communication network.

Typically, the portable-storage-device is emulating a SIM card or a UICC/USIM.

Optionally, the identity suspension method further including enabling at least two of the portable-storage-devices to interface with the hosting-mobile-device, where only one of the at least two portable-storage-devices is communicating with the hosting-mobile-device at any time.

According to further teachings of the present invention there is provided a portable-storage-device, including a memory component for storing identification data, an identification-card-interface-component operatively connected to a hosting-mobile-device to provide the hosting-mobile-device with the identification data, an update-interface-component operatively connected to an updating unit to thereby receive new identification data from a remote unit, to be stored in the memory component, and a control component for controlling the memory component, the hosting-mobile-device, the update-interface-component, and for monitoring the operational connectivity between the portable-storage-device with the remote unit.

Upon detecting no operational connectivity between the updating unit and the remote unit, setting a remote-connectivity-status to a no-connectivity state.

Upon detecting operational connectivity between the updating unit and the remote unit, setting the remote-connectivity-status to an operational state; and Upon the portable-storage-device receiving a data authentication request form the hosting-mobile-device, during the no-connectivity state, then when detecting loss of connectivity between the updating unit and the remote unit, changing the identity stored in the portable storage device to a temporary identity and instructing the hosting-mobile-device to use the temporary identification; and when detecting reestablishment of operational connectivity between the updating unit with the remote unit, changing the temporary identity stored in the portable storage device to an identity provided by the remote unit and instructing the hosting-mobile-device to use the newly provided identity.

Optionally, the identification-card-interface-component is installed in an identification-card-socket of the hosting-mobile-device, facilitating communication between the identification-card-interface-component and the hosting-mobile-device.

Preferably, the hosting-mobile-device complies with ISO/IEC 7816 specification.

Optionally, the updating unit is integrated with the portable-storage-device.

Optionally, the updating unit is built into the portable-storage-device.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. 10 In this regard, the description taken with the drawings makes apparent to those skilled in the art how embodiments of the invention may be practiced.

In the drawings.

DETAILED DESCRIPTION OF THE INVENTION

Figure 1:
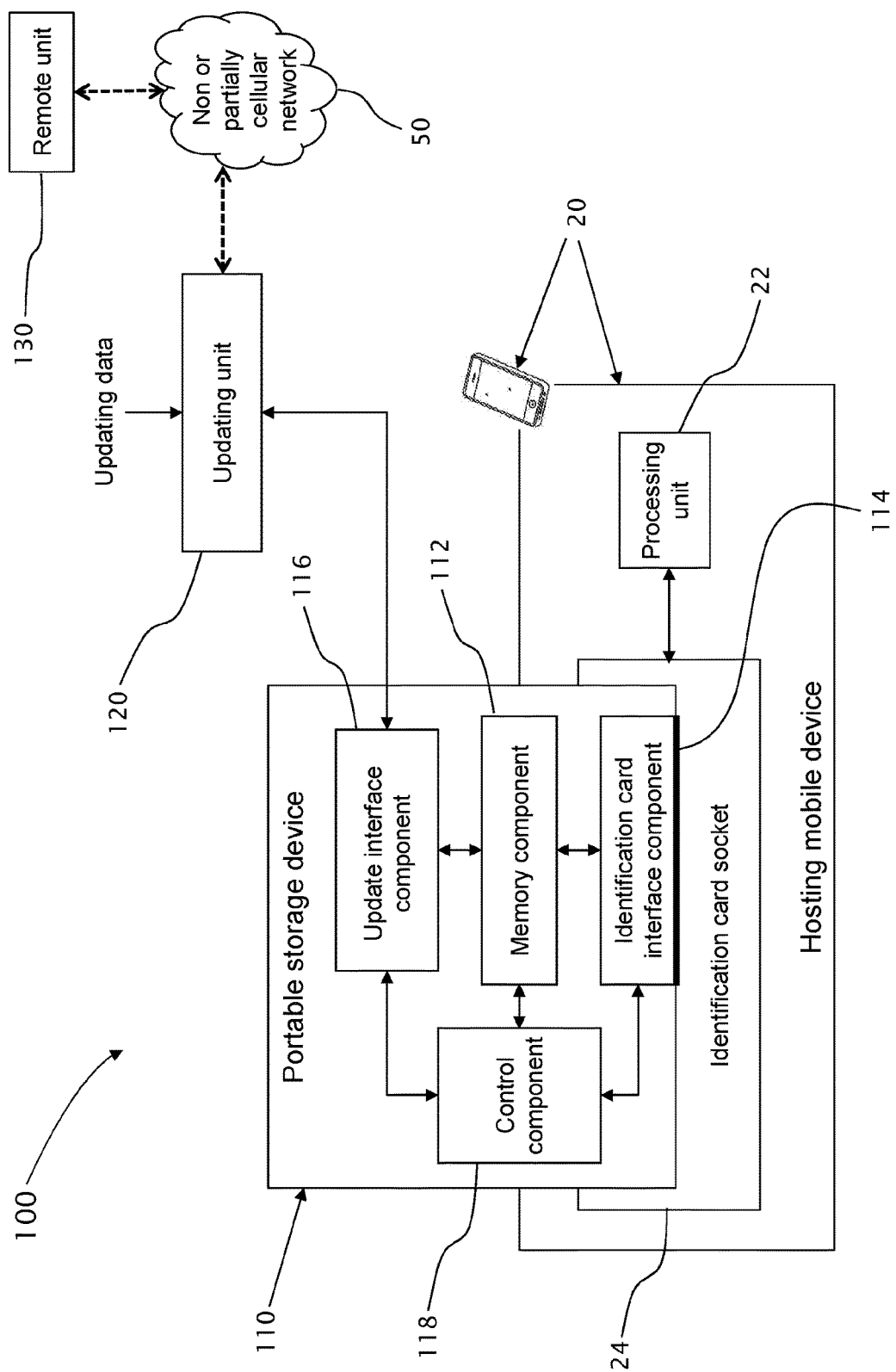
FIG. 1 is a schematic illustration of an exemplary remote update system for remote update of a portable storage device which is plugged into an identification card socket, according to some embodiments of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "bottom", "up", "upper", "down", "lower", "top" and the like, assumes that the associated item is operationally situated, that is generally vertical and facing the user.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Reference is made to the drawings. FIG. 1 is a schematic illustration of an exemplary remote update system 100 for a remote update of a portable storage device 110. The portable storage device 110 is typically plugged into an identification card socket 24, according to some embodiments of the present invention. Remote update system 100 includes portable-storage-device (alternatively termed as virtual SIM device) 110, an updating unit 120 and a remote unit 130. Typically, portable-storage-device 110 emulates a subscriber identification module (SIM) card or a UICC/USIM (Universal Integrated Circuit Card/Universal Subscriber Identity Module).

Portable-storage-device 110 includes a memory component 112 for storing identification data, an identification-card-interface-component 114, an update-interface-component 116 and a control component 118. Identification-card-interface-component 114 is operatively connected to a hosting-mobile-device 20 to thereby provide hosting-mobile-device 20 with identification data obtained from remote unit 130. Update-interface-component 116 is operatively connected to updating unit 120 to thereby receive new identification data from remote unit 130, to be stored in memory component 112. Control component 118 operatively controls memory component 112, identification-card-interface-component 114 update-interface-component 116, and monitors the operational connectivity between portable-storage-device 110 with remote unit 130.

When control component 118 detects no operational connectivity between updating unit 120 and remote unit 130, control component 118 sets a remote-connectivity-status indicator to a "no-connectivity state". The no-connectivity situation may occur, for example, when the mobile device is in a highway tunnel or a railroad tunnel. Otherwise, the remote-connectivity-status is set to an "operational state".

When portable-storage-device 110 receives an identification data request form hosting-mobile-device 20, if control component 118 detects a loss of connectivity between updating unit 120 and remote unit 130, control component 118 notifies hosting-mobile-device 20 of a change of identity to a temporary identification. When detecting reestablishment of operational connectivity between updating unit 120 and remote unit 130, control component 118 notifies hosting-mobile-device 20 of a change in identity, providing hosting-mobile-device 20 with the identity derived from the newly received identification data.

Preferably, the notification of a temporary identification includes instructions to hosting-mobile-device 20 not to search for a cellular communication network except for mandatory emergency call services. Hence, since hosting-mobile-device 20 cannot verify its identity, such an instruction prevents repeatable attempts by hosting-mobile-device 20 to authenticate its identity.

Typically, identification-card-interface-component 114 is installed in an identification-card-socket 24 of hosting-mobile-device 20, facilitating communication between identification-card-interface-component 114 and hosting-mobile-device 20. Preferably, hosting-mobile-device 20 complies with ISO/IEC 7816 specification.

Optionally, updating unit 120 is integrated with portable-storage-device 110 or built into portable-storage-device 110.

Figure 2:
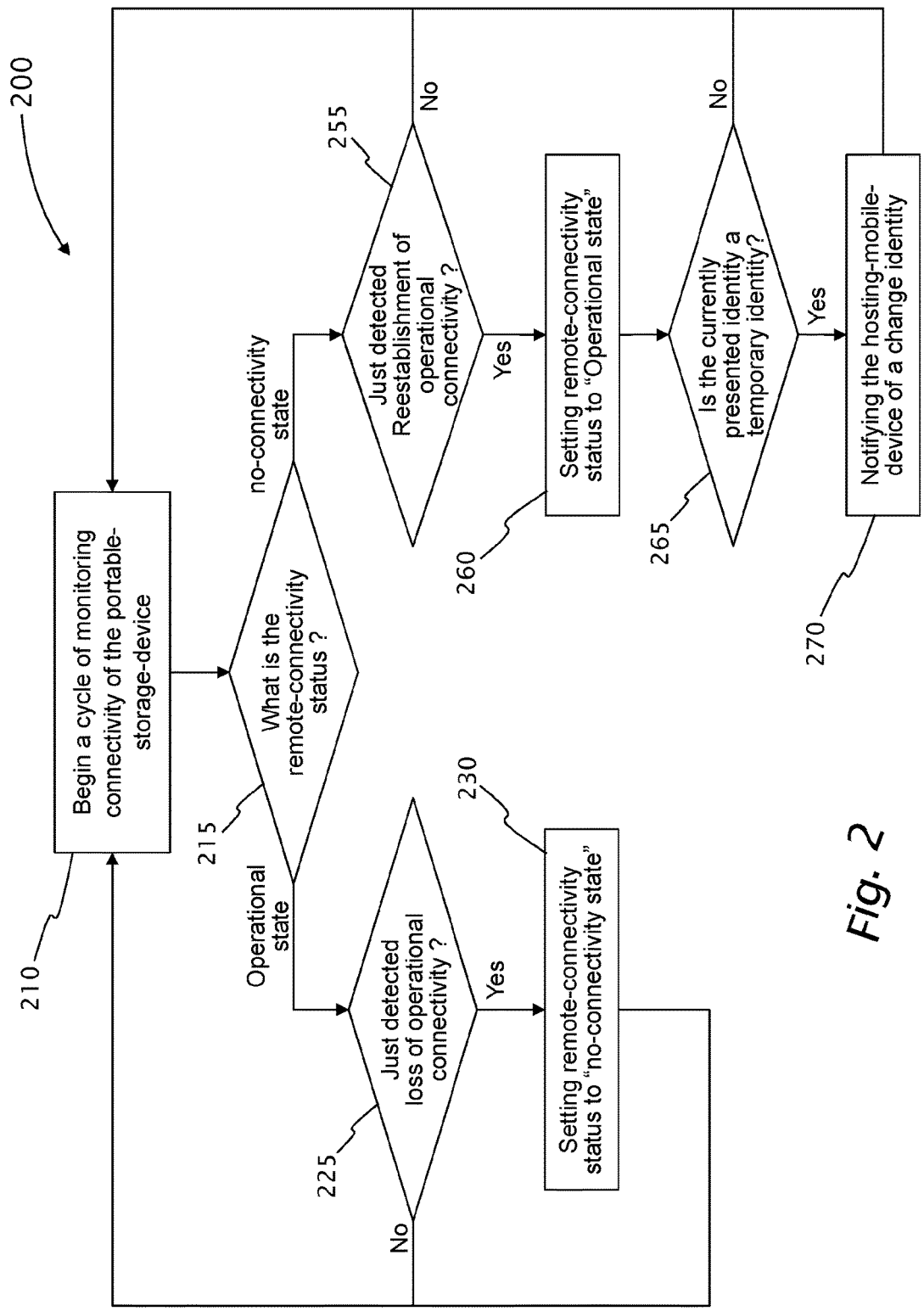
FIG. 2 is a schematic flow chart showing an exemplary connectivity-state monitoring method of the portable-storage-device with the remote unit, according to embodiments of the present invention.

Reference is now made to FIG. 2, a schematic flow chart, showing an exemplary connectivity-state monitoring method 200 of portable-storage-device 110 with remote unit 130, according to embodiments of the present invention.

It is an aspect of the present invention to monitor the communication flow of portable-storage-device 110 with remote unit 130, such as by using connectivity-state monitoring method 200. Such monitoring is required to provide identification data, when requested.

connectivity-state monitoring method 200 includes with the following steps:

Step 210: begin a cycle of monitoring the connectivity of portable-storage-device 110.
  Control component 118 continuously monitors the operational connectivity between portable-storage-device 110 with remote unit 130, cycle by cycle.

Step 215: checking what is the remote-connectivity-status.
  Control component 118 checks what is the current state of the remote-connectivity-status indicator.
  If the current state of the remote-connectivity-status indicator is "no-connectivity state", go to step 255.

Step 225: checking if has just detected loss of communication flow between portable-storage-device 110 and remote unit 130.
  Control component 118 checks if it has just detected loss of communication flow between portable-storage-device 110 and remote unit 130.
  If no loss of communication flow, between portable-storage-device 110 and remote unit 130 was detected, go to step 210.

Step 230: setting remote-connectivity-status to "no-connectivity state".
  Having just detected loss of communication flow, between portable-storage-device 110 and remote unit 130, control component 118 sets remote-connectivity-status indicator to "no-connectivity state".
  Go to step 210.

Step 255: checking if has just reestablished communication flow between portable-storage-device 110 and remote unit 130.
  Control component 118 checks if communication flow, between portable-storage-device 110 and remote unit 130, has just been reestablished.
  If communication flow, between portable-storage-device 110 and remote unit 130, has not just been reestablished, go to step 210.

Step 260: setting remote-connectivity-status to "operational state".
  The remote-connectivity-status indicator being in a "no-connectivity state" and having just detected, there is re-established communication between portable-storage-device 110 and remote unit 130, control component 118 sets remote-connectivity-status indicator to "operational state".
  Go to step 210.

Step 265: checking if the currently presented identity, to hosting-mobile-device 20, is a temporary identity.
  Control component 118 checks if the currently presented identity, to hosting-mobile-device 20, is a temporary identity.
  If the currently presented identity is not a temporary identity, go to step 210.

Step 270: notifying the hosting-mobile-device of a change of identity.
  Control component 118 notifies hosting-mobile-device 20 of a change of identity. Go to step 210.

[end of method 200]

Figure 3:
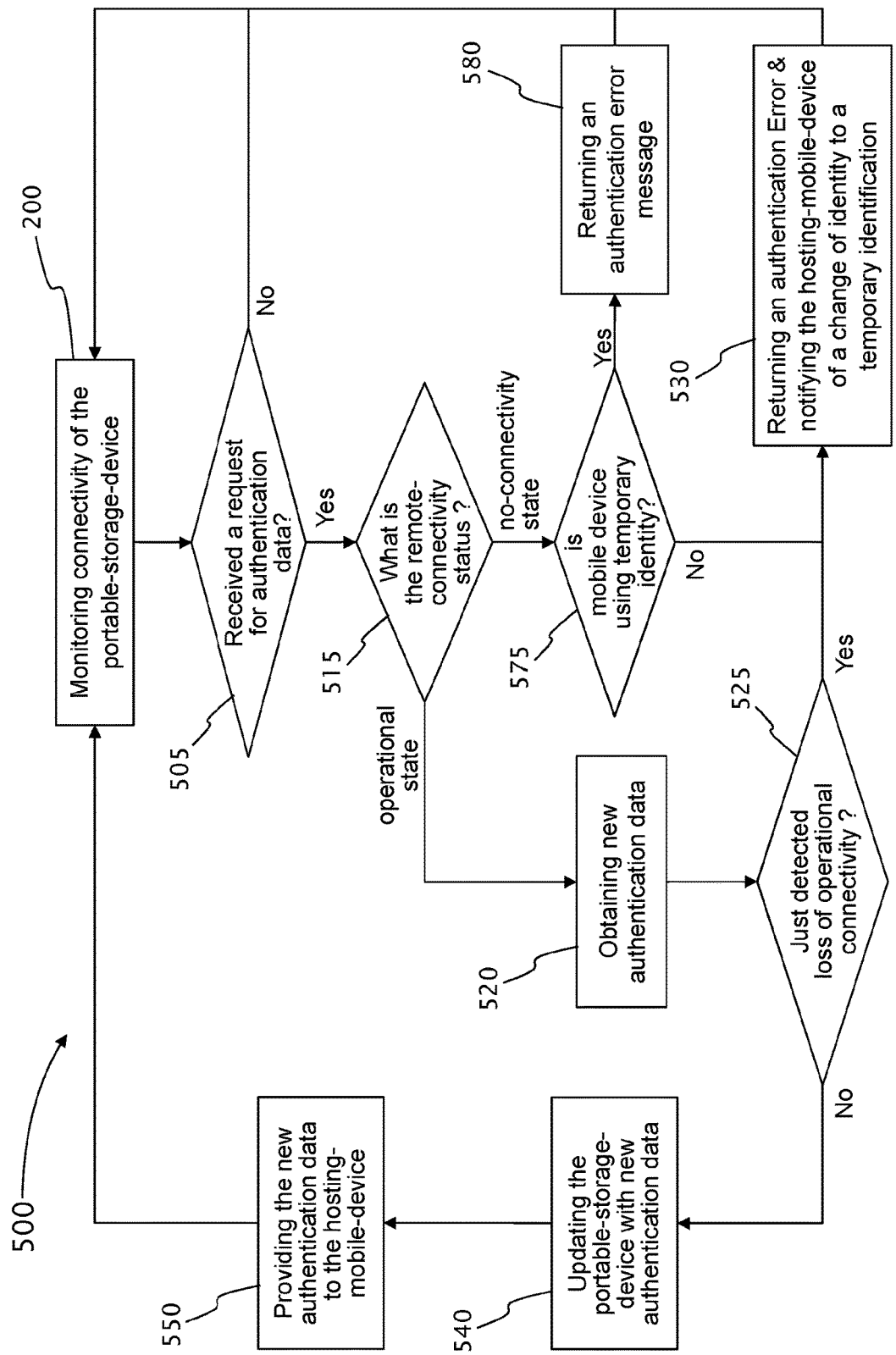
FIG. 3 is a schematic flow chart showing an exemplary basic suspended-state method of providing identity suspension to hosting-mobile-device, according to embodiments of the present invention, when the identity of the mobile device is effectively stored remotely and is not available.

Reference is now made to FIG. 3, a schematic flow chart, showing an exemplary basic suspend-state method 500 of providing suspend identity to hosting-mobile-device 20, according to embodiments of the present invention, when the identity of hosting-mobile-device 20 is effectively stored remotely and is not available.

It is an aspect of the present invention to provide identity suspension methods, such as by suspend-state method 500, for remotely updating a portable-storage-device 110, wherein portable-storage-device 110 uses an updating unit 120, operatively connected to a remote unit 130, for receiving identification data. Typically, updating unit 120 and remote unit 130 are interconnected by a non-cellular wireless network 50, such as a wireless internet network, or by a partially-cellular wireless network 50.

Suspend-state method 500 includes with the following steps:

Step 200: monitoring connectivity of portable-storage-device 110.
  Control component 118 monitors the operational connectivity between portable-storage-device 110 with remote unit 130.

Step 505: checking if received a request for identification data.
  Control component 118 checks if received a request for identification data to be obtained by portable-storage-device 110 from remote unit 130.
  If no such request for identification data was received, go to Step 200.

Step 515: checking what is the remote-connectivity-status.
  Control component 118 checks what is the current state of the remote-connectivity-status indicator.
  If the current state of the remote-connectivity-status indicator is "no-connectivity state", go to step 580.

Step 520: obtaining new identification data.
  Portable-storage-device 110 obtains new identification data from remote unit 130, typically, over a wireless network.

Step 525: checking if has just loss of communication flow between portable-storage-device 110 and remote unit 130.
  Control component 118 checks if communication flow, between portable-storage-device 110 and remote unit 130, has just been lost.
  If communication flow, between portable-storage-device 110 and remote unit 130, has not just been lost, go to step 540.

Step 530: returning an authentication error message and notifying the hosting-mobile-device of a change of identity to a temporary identification.
  Preferably, control component 118 returns an authentication error message to hosting-mobile-device 20.
  Control component 118 notifies hosting-mobile-device 20 of a change of identity to a temporary identification.
  Go to step 200.

Step 540: updating portable-storage-device 110 with the new identification data.

Control component 118 stores the newly obtained identification data in memory component 112.

Step 550: providing the new identification data to hosting-mobile-device 20.

Control component 118 provides the new identification data to hosting-mobile-device 20, typically, with no limitations, through identification-card-interface-component 114.

Go to step 200.

Step 580: returning an authentication error message.

Preferably, control component 118 returns an authentication error message to hosting-mobile-device 20.

Go to step 200.

[end of method 500]

It should be noted that when a hosting-mobile-device allows usages of at least two of portable-storage-devices, the method includes enabling the at least two of portable-storage-devices to interface with the hosting-mobile-device, where only one of the at least two portable-storage-devices is communicating with the hosting-mobile-device at any time.

Figure 4:
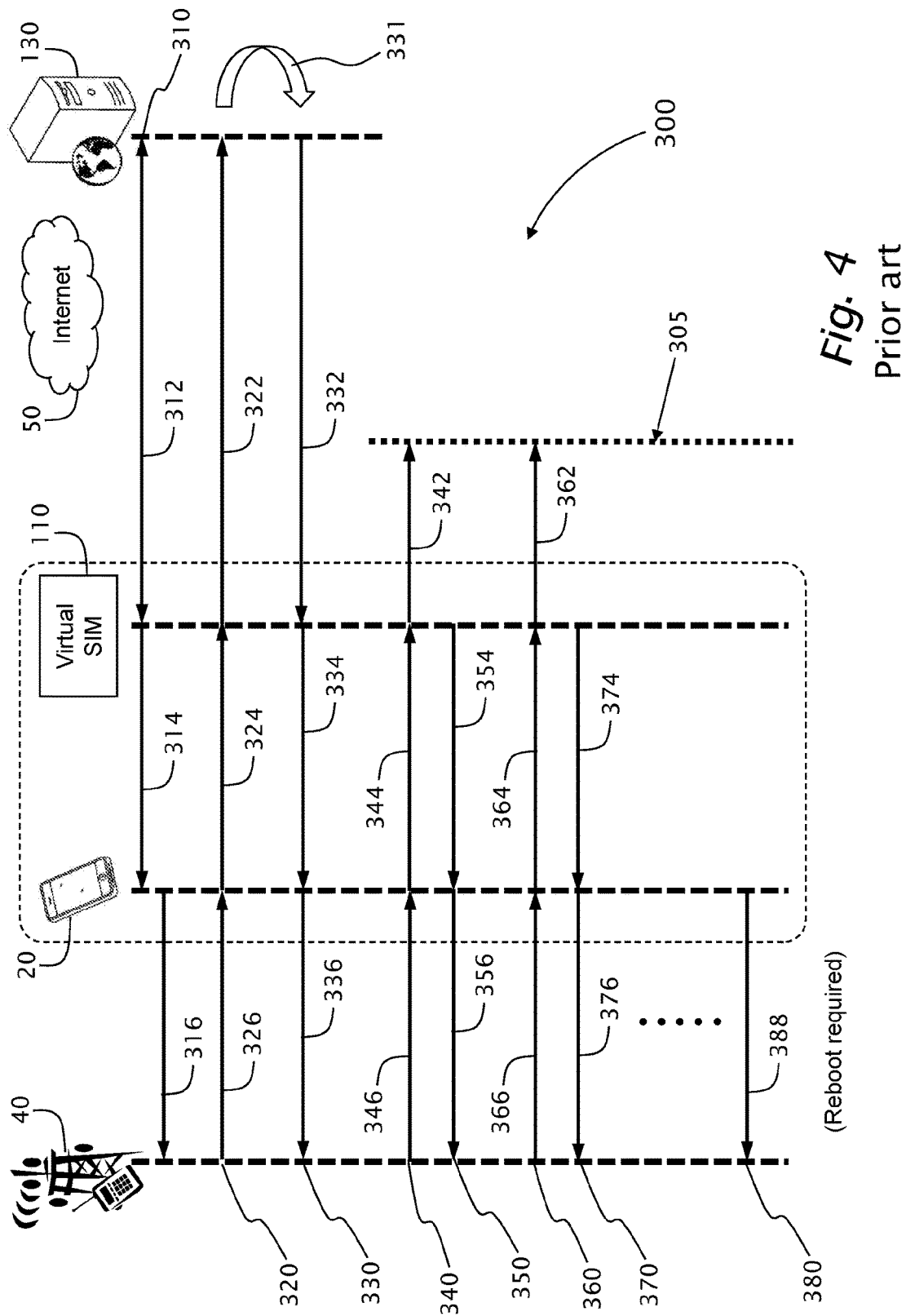
FIG. 4 (prior art) is a schematic sequence diagram illustration of an exemplary typical communication sequence between a remote unit, a hosting-mobile-device and a portable-storage-device, typically installed in an identification-card-socket, including when communication flow is lost.

Reference is now made to FIG. 4 (prior art), schematically illustrating a sequence diagram 300 of an exemplary typical communication sequence between a remote unit 130, a hosting-mobile-device 20 and a portable-storage-device 110. Portable-storage-device 110 is typically, with no limitations, installed in an identification-card-socket 24, including when communication flow is lost.

FIG. 4 describes the communication flow prior to applying identity suspension method 200, described here above, in embodiments where no SIM card is presented and the identity of hosting-mobile-device 20 is effectively stored remotely, in remote unit 130. When communication flow is sustained between portable-storage-device 110 and remote unit 130, portable-storage-device 110 obtains the IMSI from remote unit 130, as shown by communication segment 312 of time instance 310. Portable-storage-device 110 provides the IMSI to hosting-mobile-device 20 in communication segment 314, and hosting-mobile-device 20 registers with the cellular services provider 40 that owns the SIM being emulated, or in the case of roaming, with another cellular services provider having operational relationship with cellular services provider 40, that owns the SIM being emulated.

When that cellular services provider 40 sends an authentication message to that SIM card via hosting-mobile-device 20 (communication segment 326 of time instance 320), the authentication request is provided to portable-storage-device 110 (communication segment 324) that in turns forwards the authentication request to remote unit 130, as shown by communication segment 322. The requested identification data is retrieved by remote unit 130 (as shown by communication segment 331) that returns the retrieved identification data to portable-storage-device 110, as shown by communication segment 332. Portable-storage-device 110 provides the retrieved identification data to hosting-mobile-device 20 (communication segment 336) that in turns provides the retrieved identification data to cellular services provider 40, as shown by communication segment 336.

When a communication failure between portable-storage-device 110 and remote unit 130 occurs, and the cellular services provider 40 to whom the remote SIM is assigned sends an authentication request to hosting-mobile-device 20 (communication segment 346 of time instance 340, the authentication request is provided to portable-storage-device 110 (communication segment 344) that in turns attempts to forwards the authentication request to remote unit 130, as shown by communication segment 322. However, due to the communication failure between portable-storage-device 110 and remote unit 130, represented by 305, the identification data cannot be retrieved returning error messages (as shown by communication segments 354 and 356).

The cellular services provider 40 repeats the authentication process until a terminal error occurs (the cellular services provider 40 gives up or hosting-mobile-device 20 gives up, represented by communication segment 388). In such a case service may not resume until hosting-mobile-device 20 is rebooted.

Figure 5:
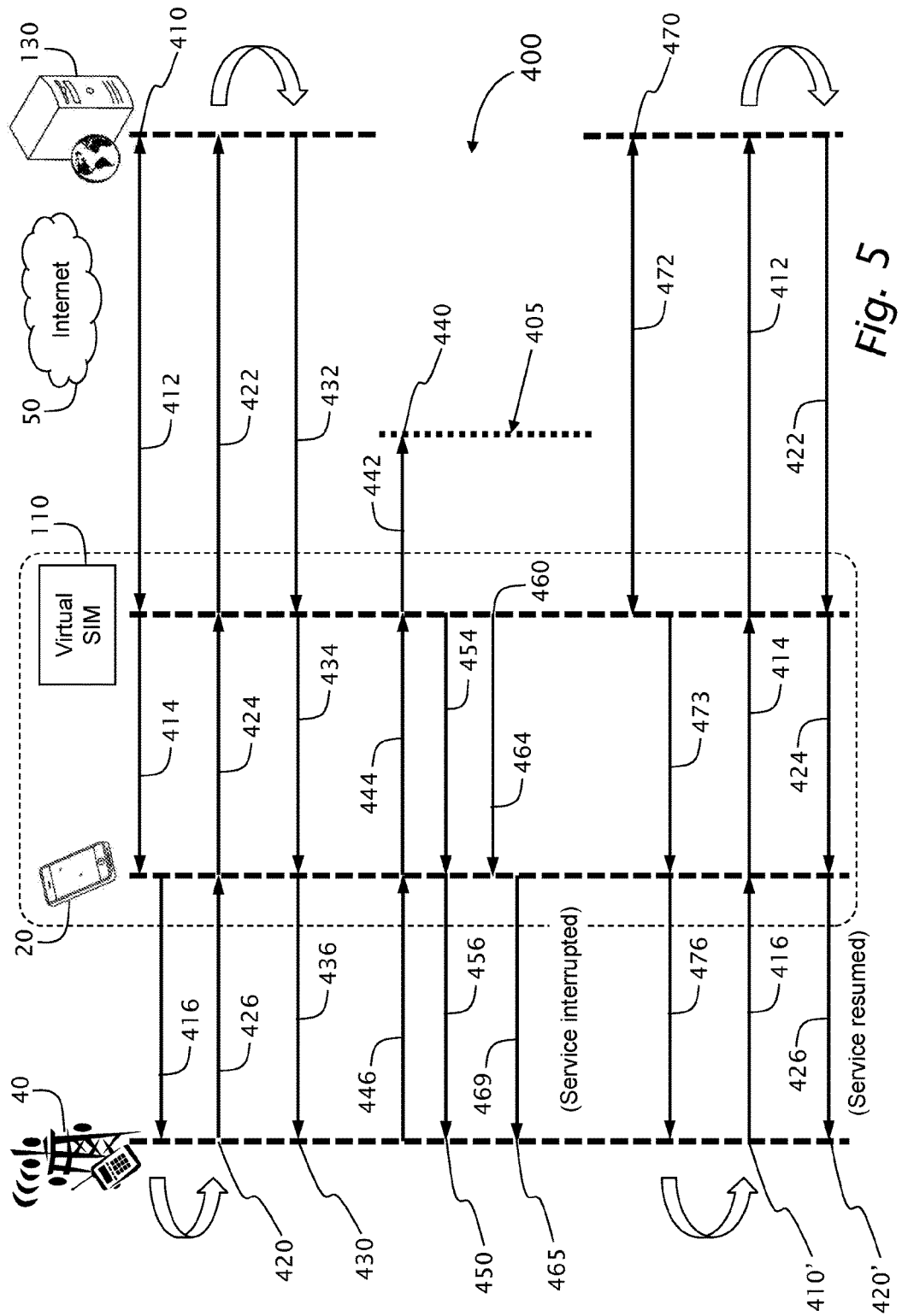
FIG. 5 is a schematic sequence diagram illustration of an exemplary typical communication sequence between a hosting-mobile-device and a portable-storage-device, typically installed in an identification card socket, according to some embodiments of the present invention, including handling loss of communication flow.

Reference is also made to FIG. 5, illustrating a schematic sequence diagram 400 of an exemplary typical communication sequence between a remote unit 130, a hosting-mobile-device 20 and a portable-storage-device 110. Portable-storage-device 110 is typically, with no limitations, installed in an identification-card-socket 24, including when communication flow is lost.

FIG. 5 describes the communication flow including applying identity suspension method 200, described here above, in embodiments where no SIM card is presented and the identity of hosting-mobile-device 20 is effectively stored remotely, in remote unit 130, including when a communication failure between portable-storage-device 110 and remote unit 130 occurs.

When communication flow is sustained between portable-storage-device 110 and remote unit 130, portable-storage-device 110 obtains the IMSI from remote unit 130, as shown by communication segment 412 of time instance 410. Portable-storage-device 110 provides the IMSI to hosting-mobile-device 20 in communication segment 414, and hosting-mobile-device 20 registers with the cellular services provider 40 (communication segment 416) that owns the SIM being emulated. When that cellular services provider 40 sends an authentication message to that SIM card via hosting-mobile-device 20 (communication segment 426 of time instance 420), the authentication request is provided to portable-storage-device 110 (communication segment 424) that in turns forwards the authentication request to remote unit 130, as shown by communication segment 422. The requested identification data is retrieved by remote unit 130 (as shown by communication segment 431) that returns the retrieved identification data to portable-storage-device 110, as shown by communication segment 432. Portable-storage-device 110 provides the retrieved identification data to hosting-mobile-device 20 (communication segment 436) that in turns provides the retrieved identification data to cellular services provider 40, as shown by communication segment 436.

When a communication failure between portable-storage-device 110 and remote unit 130 occurs (represented by 405), and the cellular services provider 40 to whom the remote SIM is assigned sends an authentication request to hosting-mobile-device 20 (communication segment 446 of time instance 440, the authentication request is provided to portable-storage-device 110 (communication segment 444) that in turns attempts to forwards the authentication request to remote unit 130, as shown by communication segment 442. However, due to the communication failure between portable-storage-device 110 and remote unit 130, the identification data cannot be retrieved returning error messages (as shown by communication segments 454 and 456). Portable-storage-device 110 identifies that there is no communication flow between portable-storage-device 110 and remote unit 130, and provides hosting-mobile-device 20 with a new identity, being a temporary identification ("parking" identification, as shown by communication segments 464 and 469), as described in step 240 of identity suspension method 200. Hosting-mobile-device 20 enters a "parking" state, in which state hosting-mobile-device 20 unregisters from the cellular services provider 40 that owns the SIM being emulated, and the cellular communication services for hosting-mobile-device 20 are suspended.

Portable-storage-device 110 continues to monitor the communication state with from remote unit 130. Once the communication flow between portable-storage-device 110 and remote unit 130 resumes, portable-storage-device 110 detects the reestablishment of communication with remote unit 130 and retrieves the IMSI from remote unit 130 (as shown by communication segment 472). Portable-storage-device 110 then provides hosting-mobile-device 20 with a new identity, as retrieved from remote unit 130 (as shown by communication segment 473). Hosting-mobile-device 20 registers the newly received IMSI with the cellular services provider 40 (communication segment 476) that owns the SIM being emulated, and the cellular communication services resume.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. An identity suspension method of remotely updating a portable-storage-device, said portable-storage-device uses an updating unit, operatively connected to a remote unit, for receiving identification data, the method comprising the steps of:
   a) monitoring operational connectivity between said portable-storage-device and said remote unit,
      upon detecting no operational connectivity between said updating unit and said remote unit, setting a remote-connectivity-status to a no-connectivity state; and
      upon detecting operational connectivity between said updating unit and said remote unit, setting said remote-connectivity-status to an operational state;
   b) upon said portable-storage-device receiving an authentication request from a hosting-mobile-device, during said operational state,
      i. obtaining new identification data by said portable-storage-device from said remote unit over a network;
      ii. updating said portable-storage-device with said new identification data received from said remote unit through said updating unit; and
      iii. providing said new identification data to said hosting-mobile-device, after said new identification data is updated in said portable-storage-device; and
   c). upon said portable-storage-device receiving an authentication request from said hosting-mobile-device, during said no-connectivity state,
      i. when detecting loss of connectivity between said updating unit and said remote unit, changing the identity stored in said portable-storage-device to a parking identity, being a temporary identity, and instructing said hosting-mobile-device to use said parking identity; and
      ii. when detecting reestablishment of operational connectivity between said updating unit and said remote unit, changing said parking identity stored in said portable-storage-device to a new identity provided by said remote unit and instructing said hosting-mobile-device to use said new identity.

2. The identity suspension method of claim 1, wherein said parking identification includes instructions to said hosting-mobile-device not to search for a cellular communication network except for mandatory emergency call services.

3. The identity suspension method of claim 1, wherein said network is selected from the group of wireless networks consisting of an internet communication network and a cellular communication network.

4. The identity suspension method of claim 1, wherein said portable-storage-device is emulating a subscriber identification module card or a universal integrated circuit/universal subscriber identification module.

5. The identity suspension method of claim 1, further comprising the step of enabling at least two of said portable-storage-devices to interface with said hosting-mobile-device, only one of said at least two portable-storage-devices is communicating with said hosting-mobile-device at any time.

6. A portable-storage-device, comprising:
   a) a memory component for storing identification data;
   b) an identification-card-interface-component operatively connected to a hosting-mobile-device to provide said hosting-mobile-device with said identification data;
   c) an update-interface-component operatively connected to an updating unit to thereby receive new identification data from a remote unit; to be stored in said memory component; and
   d) a control component for controlling said memory component, said hosting-mobile-device, said update-interface-component, and for monitoring the operational connectivity between said portable-storage-device and said remote unit,
      the control component upon detecting no operational connectivity between said updating unit and said remote unit, sets a remote-connectivity-status to a no-connectivity state and upon detecting operational connectivity between said updating unit and said remote unit, sets said remote-connectivity-status to an operational state; and
      the control component upon said portable-storage-device receives a data authentication request from said hosting-mobile-device, during said no-connectivity state, then
         when detecting loss of connectivity between said updating unit and said remote unit, changes the identity stored in said portable-storage-device to a parking identity, being a temporary identity, and instructs said hosting-mobile-device to use said parking identity; and
         when detecting reestablishment of operational connectivity between said updating unit and said remote unit, changes said parking identity stored in said portable-storage-device to a new identity provided by said remote unit and instructs said hosting-mobile-device to use said new identity.

7. The portable-storage-device of claim 6, wherein said parking identification includes instructions to said hosting-mobile-device not to search for a cellular communication network except for mandatory emergency call services.

8. The portable-storage-device of claim 6, wherein said portable-storage-device is emulating a subscriber identification module card.

9. The portable-storage-device of claim 6, wherein said identification-card-interface-component is installed in an identification-card-socket of said hosting-mobile-device, facilitating communication between said identification-card-interface-component and said hosting-mobile-device.

10. The portable-storage-device of claim 6, wherein said hosting-mobile-device complies with international standard organization/international electrotechnical commission 7816 specification.

11. The portable-storage-device of claim 6, wherein said updating unit is integrated with said portable-storage-device.

12. The portable-storage-device of claim 6, wherein said updating unit is built into said portable-storage-device.

* * * * *